M. GATES.
Hoe.
No. 12,057. Patented Dec. 12, 1854.
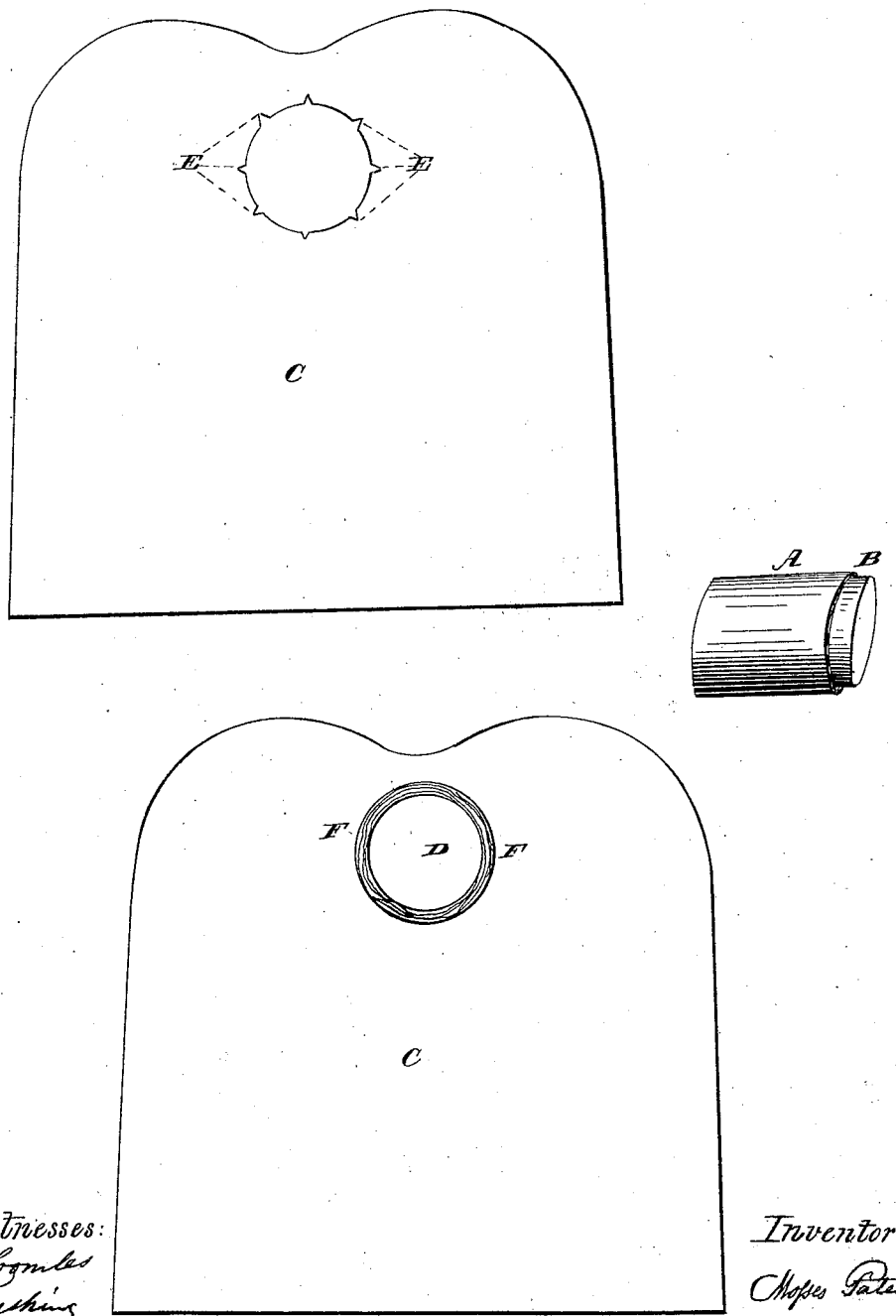

UNITED STATES PATENT OFFICE.

MOSES GATES, OF GALLIPOLIS, OHIO.

IMPROVEMENT IN HOES.

Specification forming part of Letters Patent No. 12,057, dated December 12, 1854.

*To all whom it may concern:*

Be it known that I, MOSES GATES, of Gallipolis, in the county of Gallia and State of Ohio, have invented a new and improved mode of forming and attaching the eye or socket of a hoe to the plate thereof; and I do hereby declare that the following is an exact description thereof, reference being had to the accompanying drawing, and to the letters of reference marked thereon.

The nature of my invention consists in a new mode of attaching the eye or socket to the blade or plate of the hoe, as follows, to wit: The eye or socket, in the form of a cylindrical tube, is constructed with a shoulder on the end to be attached to the blade or plate, as shown by A, the tube, and B, the shoulder, in the accompanying drawing. A round hole is pierced through the blade or plate C at the point E, as shown in the drawing, sufficient to receive said tube or socket to said shoulder, around the circumference of which hole several transverse grooves (shown by letters E in the drawing) are cut sufficient for the passage of solder or fused metal around the outside of said tube or socket and through the plate. Said tube or socket is then driven through the plate up to the shoulder, so as to form a close joint at said shoulder on the inside of the plate, and so as to protrude slightly through the plate on the outside. Said end of the tube so protruding is then hammered down on the outside of the plate, so as to form a strong burr or rivet-head, as shown at letter F in the drawing, and the joint made tight and firm by soldering or brazing, the fused metal passing through the plate around the end of the socket by means of the transverse grooves above described.

What I claim as my invention, and desire to secure by Letters Patent, is—

The construction of a tube or socket with a shoulder on the end, to be attached to the blade or plate, the attachment of the same to the plate by drawing it through the plate and hammering down the end of the tube, so as to form a burr or rivet-head on the outside of the plate, and the more firm attachment of the tube or socket to the plate by soldering or brazing, as described in the foregoing specifications.

MOSES GATES.

Witnesses:
S. A. NASH,
S. B. RATHBURN.